(12) United States Patent
Konishi et al.

(10) Patent No.: US 9,846,081 B2
(45) Date of Patent: Dec. 19, 2017

(54) LIGHT WAVELENGTH MEASUREMENT METHOD AND LIGHT WAVELENGTH MEASUREMENT APPARATUS

(71) Applicant: OSAKA UNIVERSITY, Osaka (JP)

(72) Inventors: Tsuyoshi Konishi, Osaka (JP); Takema Satoh, Osaka (JP); Tomotaka Nagashima, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 16 days.

(21) Appl. No.: 14/775,321

(22) PCT Filed: Mar. 10, 2014

(86) PCT No.: PCT/JP2014/001316
§ 371 (c)(1),
(2) Date: Sep. 11, 2015

(87) PCT Pub. No.: WO2014/141666
PCT Pub. Date: Sep. 18, 2014

(65) Prior Publication Data
US 2016/0033331 A1 Feb. 4, 2016

(30) Foreign Application Priority Data
Mar. 12, 2013 (JP) .................................. 2013-049675

(51) Int. Cl.
*G01J 3/28* (2006.01)
*G01J 3/457* (2006.01)
(Continued)

(52) U.S. Cl.
CPC ............. *G01J 3/457* (2013.01); *G01J 3/0297* (2013.01); *G01J 3/18* (2013.01); *G01J 3/2803* (2013.01);
(Continued)

(58) Field of Classification Search
CPC ............. G01J 3/18; G01J 3/2803; G01J 3/457
See application file for complete search history.

(56) References Cited

U.S. PATENT DOCUMENTS 4,326,802 A * 4/1982 Smith, Jr. ................. G01J 3/18
356/316
6,640,117 B2 * 10/2003 Makarewicz ...... A61B 5/14532
600/322
(Continued)

FOREIGN PATENT DOCUMENTS

FR    2 794 858    12/2000
JP    9-145477      6/1997
(Continued)

OTHER PUBLICATIONS

A.K. Gaigalas."Procedures for Wavelength Calibration and Spectral Response Correction of CCD Array Spectrometers", Jul. 2009.*
(Continued)

*Primary Examiner* — Michael A Lyons
*Assistant Examiner* — Maurice Smith
(74) *Attorney, Agent, or Firm* — Wenderoth, Lind & Ponack, L.L.P.

(57) ABSTRACT

A light wavelength measurement method of measuring a wavelength of target light includes: receiving target light on a second dispersion device that disperses the target light into a plurality of second beams which reach a plurality of positions corresponding to the wavelength of the target light (S106, S202); and measuring the wavelength of the target light, by using the plurality of second beams as a vernier scale for measuring the wavelength of the target light within a wavelength range specified by a main scale (S108, S204).

2 Claims, 10 Drawing Sheets

(51) Int. Cl.
 G01J 3/18 (2006.01)
 G01J 3/02 (2006.01)
 G02B 6/12 (2006.01)
(52) U.S. Cl.
 CPC ........ G02B 6/12 (2013.01); *G01J 2003/1861* (2013.01); *G01J 2003/2866* (2013.01)

(56) References Cited

U.S. PATENT DOCUMENTS

| | | | |
|---|---|---|---|
| 2005/0031259 A1 | 2/2005 | Shen et al. | |
| 2006/0290929 A1* | 12/2006 | Imura | G01J 3/02 356/328 |
| 2008/0297796 A1* | 12/2008 | Lukas | G01J 3/28 356/326 |
| 2011/0128542 A1* | 6/2011 | Sekine | G01J 3/20 356/326 |
| 2013/0235376 A1* | 9/2013 | Kamijo | G01J 3/0297 356/328 |

FOREIGN PATENT DOCUMENTS

| | | |
|---|---|---|
| JP | 2002-116087 | 4/2002 |
| JP | 2004-163154 | 6/2004 |
| JP | 2005-338021 | 12/2005 |
| JP | 2010/084957 | 7/2010 |

OTHER PUBLICATIONS

International Search Report dated Jun. 17, 2014 in International Application No. PCT/JP2014/001316.

Tsuyoshi Konishi, et al., "All-optical analog-to-digital converter by use of self-frequency shifting in fiber and a pulse-shaping technique", Journal of the Optical Society of America. B. Optical Physics, vol. 19, Issue 11, pp. 2817-2823 (Nov. 2002).

Extended European Search Report dated Nov. 22, 2016 in European Patent Application No. 14765498.2.

* cited by examiner

FIG. 2
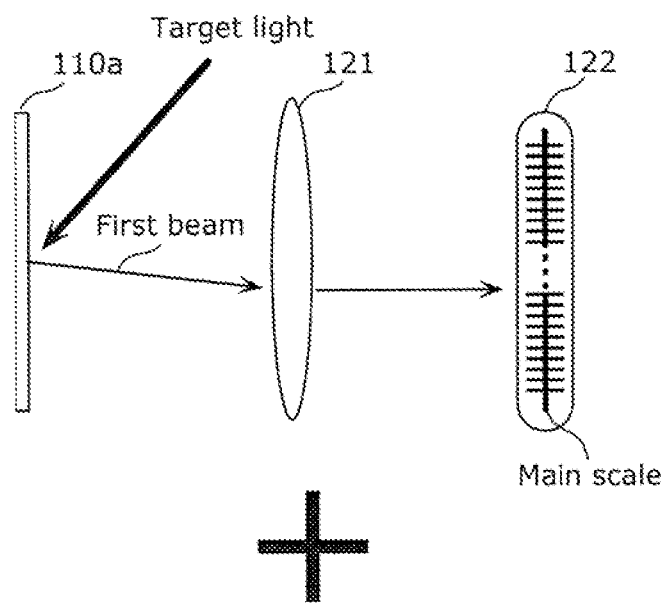
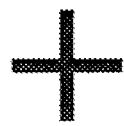
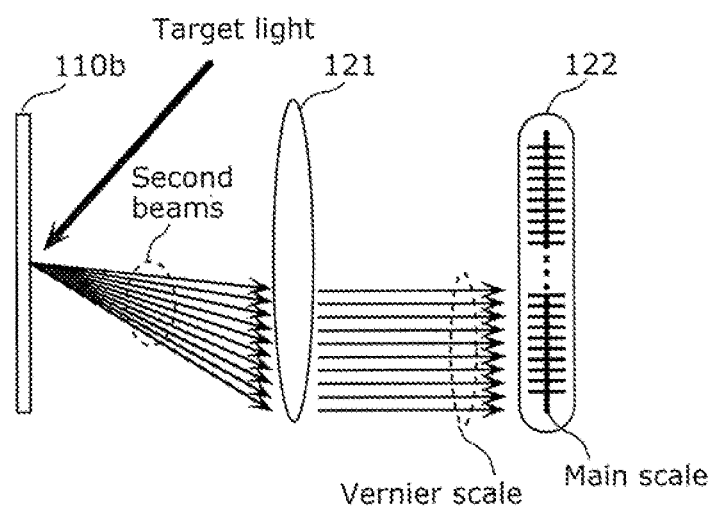

LIGHT WAVELENGTH MEASUREMENT METHOD AND LIGHT WAVELENGTH MEASUREMENT APPARATUS

TECHNICAL FIELD

The present invention relates to methods and apparatuses or measuring a wavelength of light.

BACKGROUND ART

Conventionally, in measuring a wavelength or spectrum of light, a dispersion element having angular dispersion properties for a wavelength of light (for example, a diffraction grating, a prism, or an etalon), an interferometer, or the like has been used (for example, see Patent Literature 1).

In such measurement, a measurable range of a light band and an accuracy of the measurement have a trade-off relationship. Generally, measurement applicable for a wide light band has an accuracy of approximately several nanometers, while measurement applicable for a narrow light band has an accuracy of approximately several picometers.

CITATION LIST

Patent Literature

[PTL 1] Japanese Unexamined Patent Application Publication No. 2005-338021

Non Patent Literature

[NPL 1] Tsuyoshi Konishi, Kazunori Tanimura, and Kousuke Asano, "All-optical analog-to-digital converter by use of self-frequency shifting in fiber and a pulse-shaping technique", JOSA B, Vol. 19, Issue 11, pp. 2817-2823 (2002)

SUMMARY OF INVENTION

Technical Problem

In recent years, in the fields, such as the field of information communications by Orthogonal Frequency-Division Multiplexing (OFDM), light wavelength measurement techniques having a higher accuracy than the accuracy of the conventional techniques have been demanded.

However, since the level of these conventional wavelength measurement techniques has already reached a high level, it is difficult to further increase the accuracy by the conventional approaches. For example, a pitch of a diffraction grating serving as a dispersion element has already been decreased to be approximately equal to a wavelength to be measured. Therefore, it is difficult to further increase the measurement accuracy by further decreasing the pitch of a diffraction grating or by increasing a manufacturing accuracy of the diffraction grating.

In order to address the above problems, an object of the present invention is to provide a light wavelength measurement method and a light wavelength measurement apparatus which are capable of measuring a wavelength of light with high accuracy.

Solution to Problem

In accordance with an aspect of the present invention, a light wavelength measurement method of measuring a wavelength of target light, the light wavelength measurement method including: receiving the target light on a second dispersion device that disperses the target light into a plurality of second beams which reach a plurality of positions corresponding to the wavelength of the target light; and measuring the wavelength of the target light by using the plurality of the second beams as a vernier scale for measuring the wavelength of the target light within a wavelength range specified by a main scale.

By this, it is possible to measure a wavelength of target light by using, as a vernier scale, a plurality of second beams that reach a plurality of positions corresponding to the wavelength of the target light. Therefore, it is possible to measure a wavelength of light with higher accuracy than that of conventional wavelength measurement using a main scale only. Furthermore, a diffraction grating having a variable pitch, for example, can be used as the second dispersion device, so that it is not necessary to significantly increase a manufacturing accuracy of the dispersion device. As a result, it is relatively easily measure a wavelength of light with high accuracy.

For example, it is possible that the light wavelength measurement method further includes: receiving the target light on a first dispersion device that disperses the target light into a first beam which reaches at a position corresponding to the wavelength of the target light; and specifying the wavelength range including the wavelength of the target light based on a positional relationship between the first beam and the main scale, wherein in the measuring of the wavelength of the target light, the wavelength of the target light is measured within the wavelength range specified in the specifying, by extracting, from the plurality of the second beams, a second beam which reaches a position corresponding to a graduation of the main scale.

Thus, since measurement using a vernier scale is added to conventional measurement using a main scale, it is possible to measure a wavelength of target light with high accuracy.

For example, it is also possible that in the measuring of the wavelength of the target light, a wavelength and an intensity of each of components included in the target light are measured, by measuring, per wavelength range having a size corresponding to an interval between adjacent graduations of the main scale, an intensity of a second beam which is included in the plurality of the second beams and reaches a position corresponding to a graduation of the main scale.

By this, it is possible to measure, per wavelength range having a size corresponding to an interval between adjacent graduations of a main scale, an intensity of a second beam which is included in a plurality of second beams and reaches a position corresponding to a graduation of the main scale. As a result, if the target light includes components having different wavelengths, it is possible to measure the intensity of components for each of the wavelengths with high accuracy.

For example, it is further possible that the light wavelength measurement method further includes: converting an analog signal into the target light having a wavelength corresponding to an intensity of the analog signal; and generating a digital signal according to the wavelength of the target light which is measured in the measuring.

By this, it is possible to increase a resolution of light quantization or decrease Analog-to-Digital (A/D) conversion errors.

These general and specific aspects may be implemented to a system, an apparatus, an integrated circuit, a computer program, and a computer-readable recording medium, such as a Compact Disc-Read Only Memory (CD-ROM), and may be implemented also to a desired combination of them.

Advantageous Effects of Invention

The light wavelength measurement method according to an aspect of the present invention can measure a wavelength of light with high accuracy.

BRIEF DESCRIPTION OF DRAWINGS

FIG. 2 is diagram for explaining an example of the configuration of the light wavelength measurement apparatus according to Embodiment 1.

DESCRIPTION OF EMBODIMENTS

Hereinafter, certain exemplary embodiments are described in greater detail with reference to the accompanying Drawings.

It should be noted that all the embodiments described below are generic and specific examples of the present invention. Numerical values, shapes, materials, constituent elements, arrangement positions and the connection configuration of the constituent elements, steps, the order of the steps, and the like described in the following embodiments are merely examples, and are not intended to limit the present invention. Therefore, among the constituent elements in the following embodiments, constituent elements that are not described in independent claims that show the most generic concept of the present invention are described as elements constituting more desirable configurations.

Embodiment 1

A light wavelength measurement apparatus according to Embodiment 1 first specifies a wavelength range including a wavelength of target light based on a positional relationship between (a) a main scale and (b) a first beam which is dispersed from the target light by a first dispersion device. Then, the light wavelength measurement apparatus measures the wavelength of the target light within the specified wavelength range, by using, as a vernier scale, a plurality of second beams which is dispersed from the target light by a second dispersion device.

<Configuration of Light Wavelength Measurement Apparatus>

First, the configuration of the light wavelength measurement apparatus according to the present embodiment is described.

Figure 1:
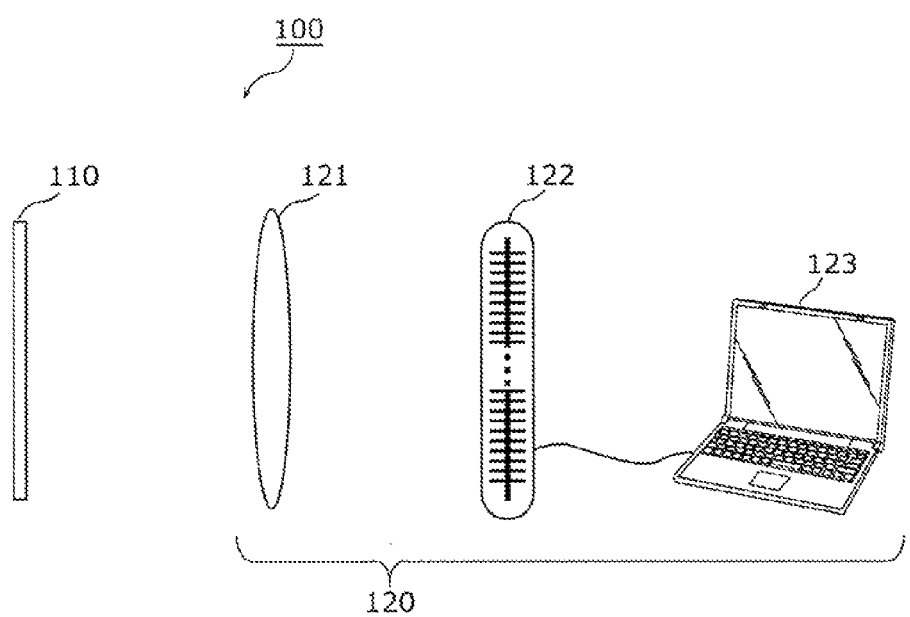
FIG. 1 is a diagram illustrating an example of a configuration of a light wavelength measurement apparatus according to Embodiment 1.

FIG. 1 is a diagram illustrating an example of a configuration of a light wavelength measurement apparatus 100 according to Embodiment 1. FIG. 2 is a diagram for explaining an example of the configuration of the light wavelength measurement apparatus 100 according to Embodiment 1. Here, it is assumed that target light (target beam) consists of only components having a single wavelength (hereinafter, referred to as "monochromatic light").

It should be noted that light measured by the light wavelength measurement apparatus 100 is not limited to monochromatic light. In other words, the light wavelength measurement apparatus 100 may measure wavelengths of light including components having various different wavelengths. Furthermore, the light wavelength measurement apparatus 100 may measure a wavelength of light and also an intensity (amplitude) of the light having the measured wavelength.

As illustrated in FIG. 1, the light wavelength measurement apparatus 100 includes a dispersion device 110 and a measurement unit 120.

<Dispersion Device>

The dispersion device 110 includes first dispersion device 110a and second dispersion device 110b.

The first dispersion device 110a disperses target light into a first beam that reaches a position corresponding to a wavelength of the target light. For example, as illustrated in (a) in FIG. 2, the first dispersion device 110a reflects target light that reaches a position which depends on the wavelength of the target light.

According to the present embodiment, the first dispersion device 110a is a reflective diffraction grating having properties of varying a diffraction angle of target light depending on a wavelength of the target light (angular dispersion properties). However, the first dispersion device 110a is not limited to the reflective diffraction grating as illustrated in (a) in FIG. 2. For example, the first dispersion device 110a may be a transmissive diffraction grating. Furthermore, the first dispersion device 110a may be, for example, a prism or an etalon.

The second dispersion device 110b disperses the target light into a plurality of second beams that reach a plurality of positions corresponding to the wavelength of the target light. For example, as illustrated in (b) in FIG. 2, the second dispersion device 110b reflects the target light that reach a plurality of positions arranged at substantially equal intervals depending on the wavelength of the target light. The expression "substantially equal intervals" include precisely equal intervals and intervals which can be considered as substantially equals.

According to the present embodiment, the second dispersion device 110b is a reflective diffraction grating having a pitch that varies depending on an incident direction of target light. However, the second dispersion device 110b is not limited to such a reflective diffraction grating. For example, the second dispersion device 110b may be a transmissive diffraction grating. Furthermore, the second dispersion device 110b may be not a diffraction grating but an Arrayed Waveguide Grating (AWG) device. Furthermore, for example, the second dispersion device 110b may be implemented to a Computer Generated Hologram (CGH).

According to the present embodiment, the first dispersion device 110a and the second dispersion device 110b are arranged side by side in a direction perpendicular to a plane on which a plurality of second beams travel (in other words, in a depth direction of the sheet of FIG. 2). In this case, the first dispersion device 110a and the second dispersion device 110b may be integrated together or separated from each other. It is also possible, for example, that the first dispersion device 110a and the second dispersion device 110b are alternately provided at the same position.

<Measurement Unit>

The measurement unit 120 measures a wavelength of target light, by using a plurality of second beams from the second dispersion device 110b as a vernier scale for measuring the wavelength of the target light within a wavelength range specified by a main scale.

More specifically, the measurement unit 120 first specifies a wavelength range including a wavelength of target light, based on a positional relationship between a first beam from the first dispersion device 110 and the main scale. Then, the measurement unit 120 extracts, from among a plurality of second beams from the second dispersion device 110b, a second beam that reaches a position corresponding to one of graduations of the main scale. As a result, the measurement unit 120 more accurately measures the wavelength of the target light within the specified wavelength range. In other words, the measurement unit 120 extracts a second beam having reached a position matching one of graduations of the main scale, from among the plurality of second beams from the second dispersion device 110b, thereby measuring a wavelength of the target light within the specified wavelength range.

The main scale is a scale for measuring a wavelength. In other words, the main scale is a scale for measuring a wavelength of target light with a predetermined first accuracy or with a predetermined first resolution. In this example, the main scale associates a reached position of the first beam to a wavelength range including a wavelength of the target light.

The vernier scale is an auxiliary scale for more accurately measuring a wavelength of target light by a value smaller than one graduation of the main scale. In other words, the vernier scale is a scale for measuring a wavelength of target light with second accuracy higher than the first accuracy or with a second resolution higher than the first resolution, based on the wavelength range measured by the main scale. In this example, the second beams serve as graduations of the vernier scale.

An interval between adjacent graduations of a vernier scale is different from an interval between adjacent graduations of a main scale. For example, if the interval between adjacent graduations of the vernier scale is nine tenth of the interval between adjacent graduations of the main scale, it is possible to measure a wavelength by a unit of measurement that is one tenth of that of the main scale. Furthermore, for example, if the interval between adjacent graduations of the vernier scale is nineteen twentieth of the interval between adjacent graduations of the main scale, it is possible to measure a wavelength by a unit of measurement that is one twentieth of that of the main scale. In other words, second beams dispersed so that the interval between adjacent graduations of the vernier scale (interval between adjacent second beams) is $(n-1)/n$ (where n is an integer greater than 1) of the interval between adjacent graduations of the main scale (interval between adjacent pixels in the imaging device). As a result, it is possible to measure a wavelength by a unit of measurement that is $1/n$ of that of the main scale. It should be noted that the interval between adjacent graduations of the vernier scale may be longer than the interval between adjacent graduations of the main scale. Even in this case, a difference of graduation interval between the main scale and the vernier scale enables wavelength measurement by a smaller unit of measurement than that of the main scale.

Here, an example of the configuration of the measurement unit 120 is described in more detail. According to the present embodiment, the measurement unit 120 includes a lens 121, an imaging device 122, and a measuring unit 123.

The lens 121 is provided between the dispersion device 110 and the imaging device 122. The lens 121 refracts a first beam from the first dispersion device 110a and a plurality of second beams from the second dispersion device 110b, thereby guiding the beams to be incident on the imaging device 122.

The imaging device 122 is an image sensor, such as a Complementary Metal Oxide Semiconductor (CMOS) image sensor or a Charge Coupled Device (CCD) image sensor. The imaging device 122 has at least one column of pixels. Pixels included in the pixel column are arranged at positions corresponding to graduations of the main scale.

The measuring unit 123 obtains data of light intensity distribution of the first beam from the imaging device 122. Then, the measuring unit 123 specifies a wavelength range including the wavelength of the target light, based on one of graduations of the main scale which corresponds to the position of a pixel having the highest intensity in the light intensity distribution of the first beam.

Furthermore, the measuring unit 123 obtains data of light intensity distribution of the second beams from the imaging device 122. Then, the measuring unit 123 extracts a second beam having the highest intensity from the second beams, based on the light intensity distribution of the second beams.

The second beam extracted in the above manner is a second beam that reaches a position corresponding to one of the graduations of the main scale. In other words, the extracted second beam corresponds to a graduation of the vernier scale which matches a graduation of the main scale. Therefore, the measuring unit 123 measures the wavelength of the target light within the specified wavelength range according to the extracted second beam.

<Light Wavelength Measurement Method>

Next, the description is given for a method of measuring a wavelength of target light by using the light wavelength measurement apparatus 100 having the above-described configuration.

Figure 3:
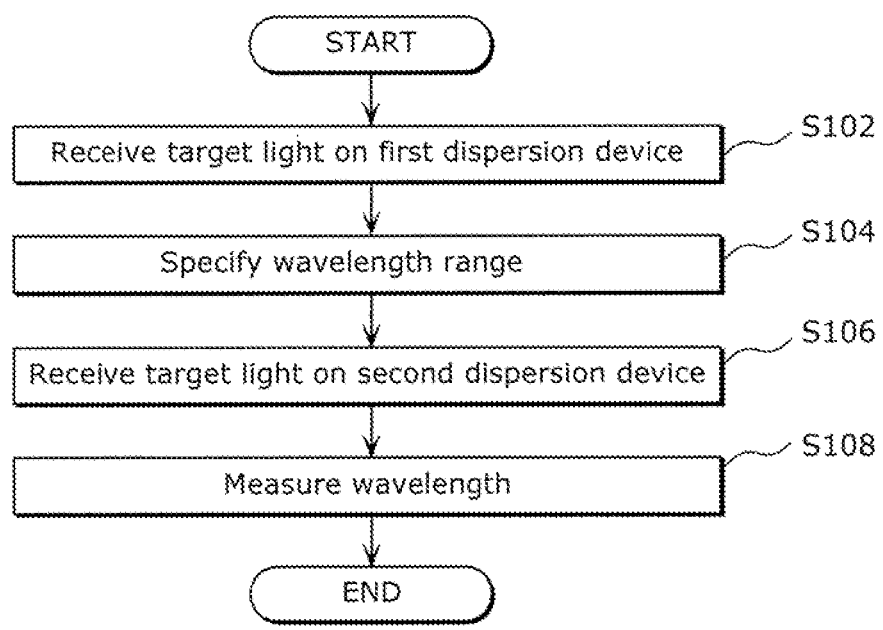
FIG. 3 is a flowchart of an example of a light wavelength measurement method according to Embodiment 1.

FIG. 3 is a flowchart of an example of a light wavelength measurement method according to Embodiment 1.

First, the first dispersion device 110a receives target light (S102). Subsequently, the measurement unit 120 specifies a wavelength range including the wavelength of the target light, based on a positional relationship between (a) the main scale and (b) a first beam that is dispersed from the target light by the first dispersion device 110a, in the previously-described manner (S104).

Next, the second dispersion device 110b receives the same target light (S106). It should be noted that the step S106 may be performed in parallel to the step S102.

Then, in the same manner as described previously, the measurement unit 120 extracts, from among the second beams from the second dispersion device 110b, a second beam that reaches a position corresponding to one of the graduations of the main scale, and thus measures the wavelength of the target light within the specified wavelength range (S108).

As described above, the light wavelength measurement apparatus and the light wavelength measurement method according to the present embodiment are capable of measuring a wavelength of target light by using, as a vernier scale, a plurality of second beams having reached a plurality of positions corresponding to the wavelength of the target light. Therefore, it is possible to measure the wavelength with higher accuracy than accuracy of the conventional wavelength measurement using a main scale only. In addition, the second dispersion device may be implemented to a diffraction grating having a variable pitch, so that it is not necessary to significantly increase a manufacturing accuracy of the dispersion device. As a result, it is possible to relatively easily measure a wavelength with high accuracy.

It should be noted that the measurement unit 120 does not need to include the lens 121 and the imaging device 122. In this case, for example, the measurement unit 120 may include merely a member with graduations, instead of the imaging device 122. Even in this case, it is possible to measure a wavelength with high accuracy by using a vernier scale checked by user's eyes.

Variation of Embodiment 1

Next, a variation of Embodiment 1 is described.

Figure 4:
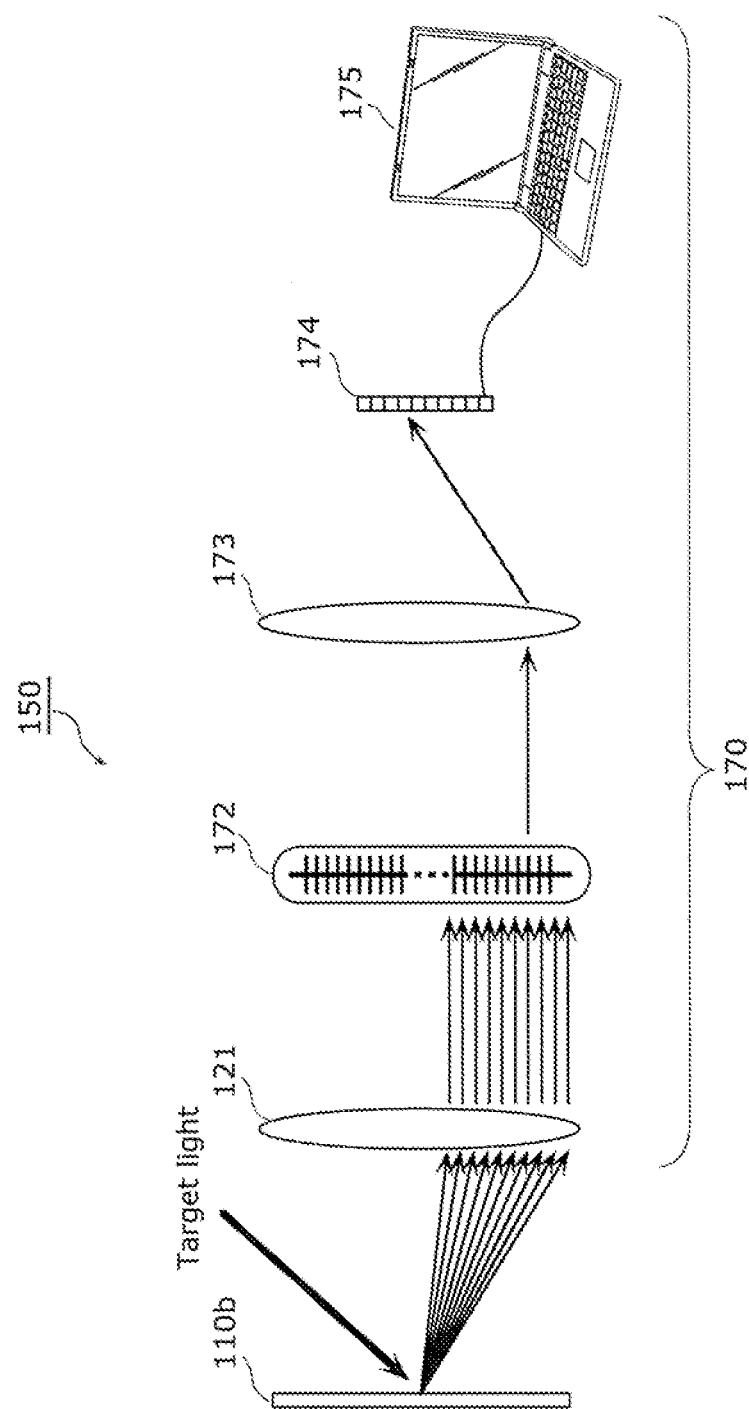
FIG. 4 is a diagram illustrating an example of a configuration of a light wavelength measurement apparatus according to a variation of Embodiment 1.

FIG. 4 is a diagram illustrating an example of a configuration of a light wavelength measurement apparatus 150 according to a variation of Embodiment 1. The same reference numerals in FIGS. 1 and 2 are assigned to identical structural elements in FIG. 4, so that the explanation of the identical structural elements are not always repeated below.

The light wavelength measurement apparatus 150 includes the dispersion device 110 and a measurement unit 170. The measurement unit 170 includes the lens 121, a slit member 172, a lens 173, an imaging device 174, and a measuring unit 175.

The slit member 172 has slits at positions of graduations of the main scale. Therefore, among a plurality of second beams, only a second beam that reaches a position corresponding to a graduation of the main scale passes through the slit member 172 and eventually reaches the lens 173.

The lens 173 refracts the second beam having passed through the slit member 172 to be incident on a pixel of the imaging device 174 which corresponds to the second beam. In other words, the second beam having passed through the slit member 172 is incident on a pixel corresponding to a relative position of the second beam among the second beams. For example, in FIG. 4, if the seventh second beam counted from the top of the second beams passes through the slit member 172, the seventh second beam is incident on the fourth pixel counted from the top of the imaging device 174.

The imaging device 174 is an image sensor having pixels that are more than the number of the second beams.

The measuring unit 175 detects a position of the pixel on which the second beam having passed through the slit member 172 is incident. Then, based on the detected pixel position, the measuring unit 175 determines which second beam among the second beams has passed through the sift member 172. Then, within the wavelength range specified by the main scale, the measuring unit 175 measures a wavelength of the determined second beam as the wavelength of the target light. In other words, the measuring unit 175 can measure the wavelength of the target light within the wavelength range specified by the main scale, by detecting on which pixel in the imaging device 174 the second beam is incident.

As described above, according to the light wavelength measurement apparatus according to the present variation, it is possible to measure a wavelength of target light with high accuracy, by adding wavelength measurement using a vernier scale to the conventional wavelength measurement using a main scale.

Although it has been described in Embodiment 1 and its variation that the target light is monochromatic light, the light wavelength measurement apparatus can measure a plurality of wavelengths even if, for example, target light includes components of a plurality of wavelengths within the wavelength range specified by the main scale. In other words, the light wavelength measurement apparatus can distinguish and separately measure different wavelengths of target light which are included in the wavelength range specified by the main scale.

Embodiment 2

Next, Embodiment 2 is described in detail with reference to the Drawings. A light wavelength measurement apparatus according to the present embodiment measures a wavelength and an intensity (amplitude) of a component included in target light by using a plurality of second beams, per wavelength range having a size corresponding to an interval between adjacent graduations of a main scale.

<Configuration of Light Wavelength Measurement Apparatus>

First, the configuration of the light wavelength measurement apparatus according to the present embodiment is described.

Figure 5:
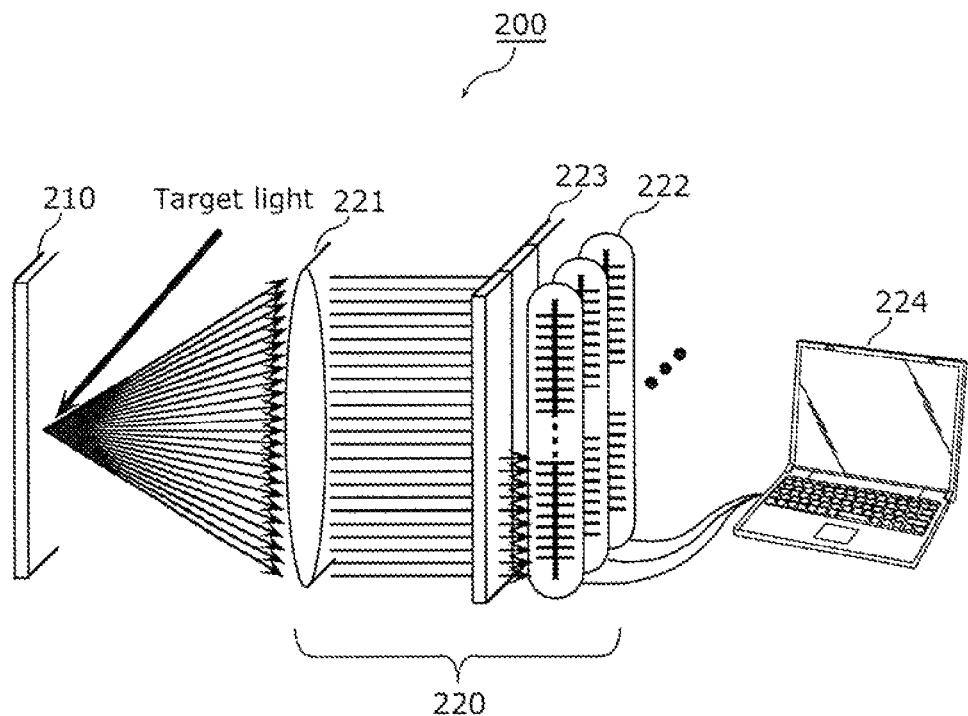
FIG. 5 is a diagram for explaining an example of a configuration of a light wavelength measurement apparatus according to Embodiment 2.

FIG. 5 is a diagram for explaining an example of a configuration of a light wavelength measurement apparatus 200 according to Embodiment 2. In this example, it is assumed that target light (target beam) is light including components having various different wavelengths.

As illustrated in FIG. 5, the light wavelength measurement apparatus 200 includes a dispersion device 210 and a measurement unit 220.

<Dispersion Device>

The dispersion device 210 disperses target light, into a plurality of beams that reach a plurality of positions corresponding to each of wavelengths of target light. The dispersion device 210 corresponds to the second dispersion device 110b according to Embodiment 1. Therefore, the plurality of beams correspond to the plurality of second beams. However, in the present embodiment, since the target light includes components having various different wavelengths, the plurality of beams dispersed by the dispersion device 210 include a plurality of beams for each of components having the respective wavelengths.

<Measurement Unit>

The measurement unit 220 measures a wavelength and an intensity of a component included in target light per wavelength range. More specifically, the measurement unit 220 measures, per wavelength range having a size corresponding to an interval between adjacent graduations of the main scale, an intensity of a beam which is included in the beams from the dispersion device 210 and reaches a position corresponding to a graduation of the main scale. The "wavelength range having a size corresponding to an interval between adjacent graduations of the main scale" refers to an accuracy or a resolution of a wavelength of a component which can be measured by using a plurality of beams dispersed by the dispersion device 210 for each of different wavelengths.

Here, an example of a configuration of the measurement unit 220 is described in more detail. According to the present embodiment, the measurement unit 220 includes a lens 221, an imaging device 222, an optical filter 223, and a measuring unit 224.

The lens 221 is provided between the dispersion device 210 and the imaging device 222. The lens 221 refracts a plurality of beams from the dispersion device 210 to be incident on the optical filter 223.

The imaging device 222 is an image sensor, such as a CMOS image sensor or a CCD image sensor. The imaging device 222 has a plurality of pixel columns corresponding to respective wavelength ranges. Here, pixels in each of the pixel columns are arranged at positions indicating graduations of the main scale.

The optical filter 223 is provided between the lens 221 and the imaging device 222. The optical filter 223 has a plurality of filter regions corresponding to the respective pixel columns of the imaging device 222.

Each of the filter regions allows only beams, which have wavelengths included in a corresponding wavelength range that corresponds to a pixel column, to pass through the filter region. In other words, beams having passed through the corresponding filter regions are incident on corresponding pixel columns. That is, each of the pixel columns receives a plurality of beams having wavelengths included in a corresponding wavelength range that corresponds to a pixel column.

The measuring unit 224 obtains data of light intensity distribution of the beams, for each of the pixel columns of the imaging device 222. Each light intensity distribution indicates intensities of beams having reached positions corresponding to respective graduations of the main scale. In other words, the measuring unit 224 obtains data of light intensity distribution of a plurality of beams, for each of the pixel columns of the imaging device 222. Therefore, the measuring unit 224 can measure a wavelength and an intensity of each of the components included in the target light, for each of wavelength ranges corresponding to the respective pixel columns. As a result, the measuring unit 224 can measure a spectrum of the target light with high accuracy.

<Light Wavelength Measurement Method>

Next, the description is given for a method of measuring wavelengths of target light and intensities of the target light for the respective wavelengths, by using the light wavelength measurement apparatus 200 having the above-described configuration.

Figure 6:
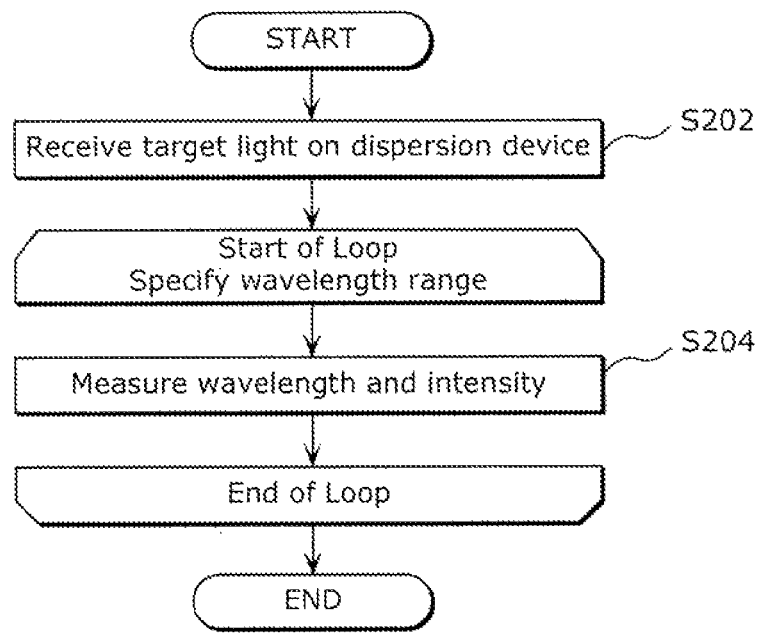
FIG. 6 is a flowchart of an example of a light wavelength measurement method according to Embodiment 2.

FIG. 6 is a flowchart of an example of the light wavelength measurement method according to Embodiment 2.

First, the dispersion device 210 receives target light (S202). Subsequently, the step S204 is performed per wavelength range. More specifically, the measurement unit 220 measures, per wavelength range having a size corresponding to an interval between adjacent graduations of the main scale, an intensity of a beam which is included in a plurality of beams from the dispersion device 210 and reaches a position corresponding to one of graduations of the main scale. In this manner, the measurement unit 220 measures a wavelength and an intensity of the target light per wavelength range (S204).

As described above, the light wavelength measurement apparatus and the light wavelength measurement method according to the present embodiment are capable of measuring, per wavelength range having a size corresponding to an interval between adjacent graduations of the main scale, an intensity of a beam which is included in a plurality of beams and reaches a position corresponding to one of the graduations of the main scale. Therefore, when the target light includes components having various different wavelengths, an intensity of a component can be measured for each of the wavelengths with high accuracy.

It should be noted that, regarding the imaging device 222 according to the present embodiment, an interval between adjacent pixels may be different among the pixel columns (in other words, an interval between adjacent pixels may vary depending on a wavelength range corresponding to a pixel column). Therefore, if an interval between adjacent beams slightly varies depending on wavelengths, it is possible to set an interval between pixels to be appropriate for the variation of the beam interval. As a result, it is possible to measure a wavelength with high accuracy.

<Stimulation Results>

Figure 11:
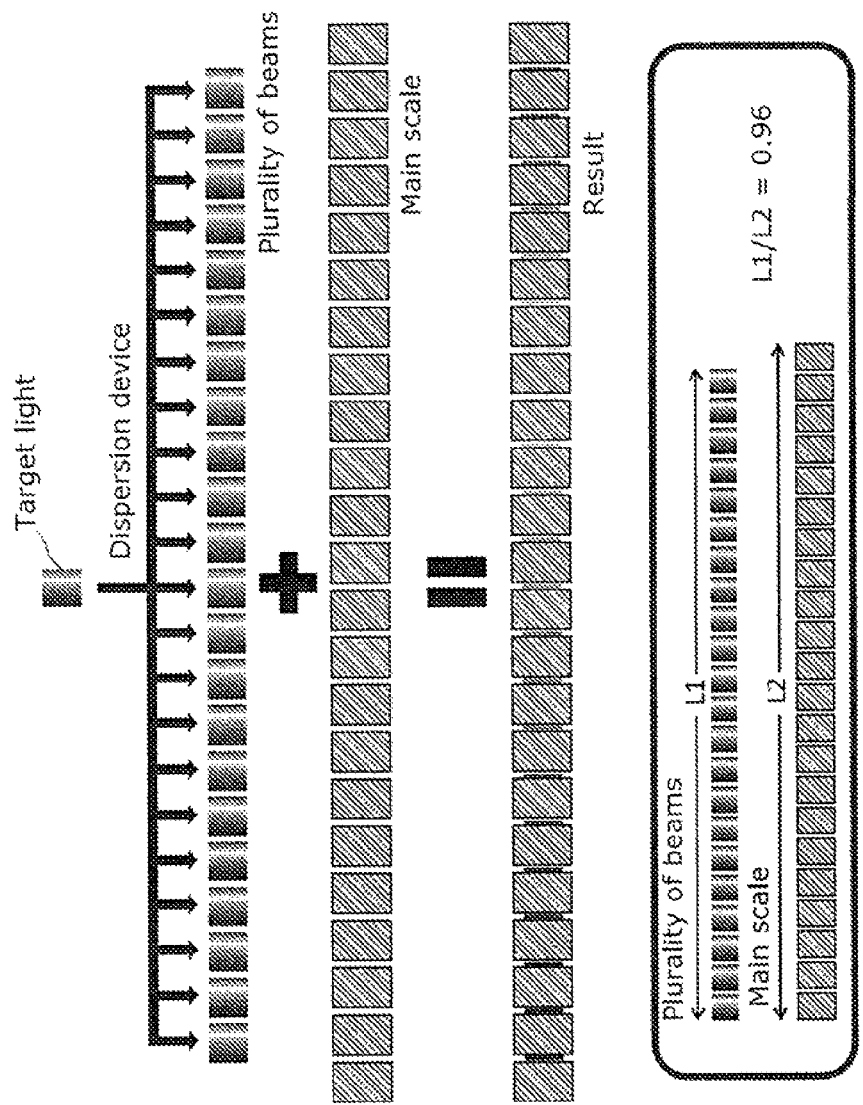
FIG. 11 is an explanatory diagram showing results of simulating the light wavelength measurement method according to Embodiment 2.

Here, results of simulating the light wavelength measurement method according to Embodiment 2 are described. FIG. 11 is an explanatory diagram showing results of simulating the light wavelength measurement method according to Embodiment 2.

FIG. 11 shows spectrum distribution in which rectangle blocks show target light and a plurality of beams. An interval between adjacent beams (interval between adjacent graduations of a vernier scale) is 0.96 times as long as an interval between adjacent graduations of a main scale.

In other words, in this simulation, the dispersion device dispersed target light into twenty-two beams arranged at intervals each of which was 0.96 times as long as the interval between adjacent graduations of the main scale. Then, as illustrated in FIG. 11, when the twenty-two beams overlapped the main scale, a resulting spectrum distribution was twenty-two times larger than the spectrum distribution of the target light. In other words, it was possible to measure, with high accuracy, an intensity of a component for each of wavelengths included in the target light.

Other Embodiments

Although the light wavelength measurement apparatuses according to one or more modes have been described based on the embodiments, the present invention is not limited to the embodiments. Those skilled in the art will be readily appreciate that various modifications and combinations of the structural elements in the different embodiments are possible without materially departing from the novel teachings and advantages of the present invention. Accordingly, all such modifications and combinations are intended to be included in the scope of the present invention.

For example, although it has been described in the above embodiments that the lens included in the measurement unit is a transmissive lens, the lens may be a reflective lens. It is also possible that the measurement unit includes a plurality of lenses.

Moreover, according to Embodiment 2, the light wavelength measurement apparatus may include a slit member as described in the variation of Embodiment 1.

It is further possible that the light wavelength measurement apparatus also includes an optical filter. For example, it is possible that an optical filter for eliminating components having wavelengths not included in a target wavelength range is provided between the dispersion device and the lens, or between, the lens and the imaging device. It is still further possible that, if the dispersion device is a diffraction grating, an optical filter for eliminating lights diffracted in orders except light diffracted in a target order.

Figure 7:
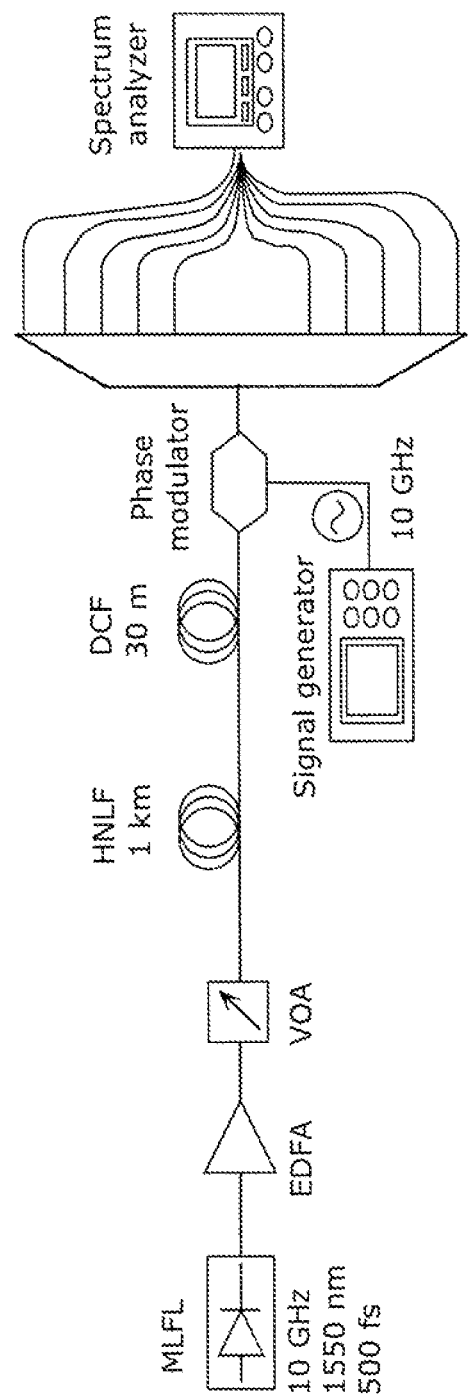
FIG. 7 is a diagram illustrating an example of a configuration of a light A/D conversion device.

Furthermore, the light wavelength measurement apparatus is applicable to a light Analog-to-Digital (A/D) conversion (quantization) technique. FIG. 7 is a diagram illustrating an example of a configuration of a light A/D conversion device that includes the above-described light wavelength measurement apparatus as a spectrum analyzer.

The light A/D conversion device in FIG. 7 converts an analog signal to a light signal having a wavelength corresponding to an intensity of the analog signal, and measures the wavelength of the converted light signal (target light) to generate an output digital signal. The wavelength of the converted light signal is measured with high accuracy, by using the light wavelength measurement apparatus according to any one of the above-described embodiments. As a result, it is possible to increase a resolution of light quantization or decrease A/D conversion errors, Since the light A/D conversion device in FIG. 7 is described in detail in Non-Patent Literature 1, the light A/D conversion device is not explained in this description.

Experimental Results

Figure 8:
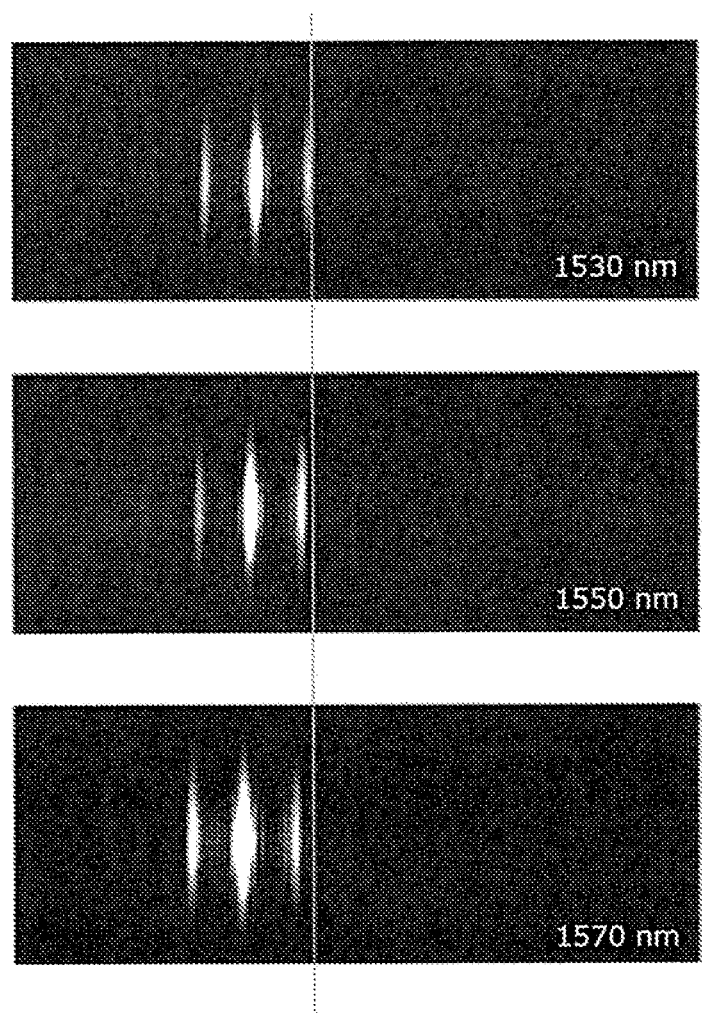
FIG. 8 is a diagram showing dispersion results of a plurality of beams dispersed from each of three target lights.
Figure 9:
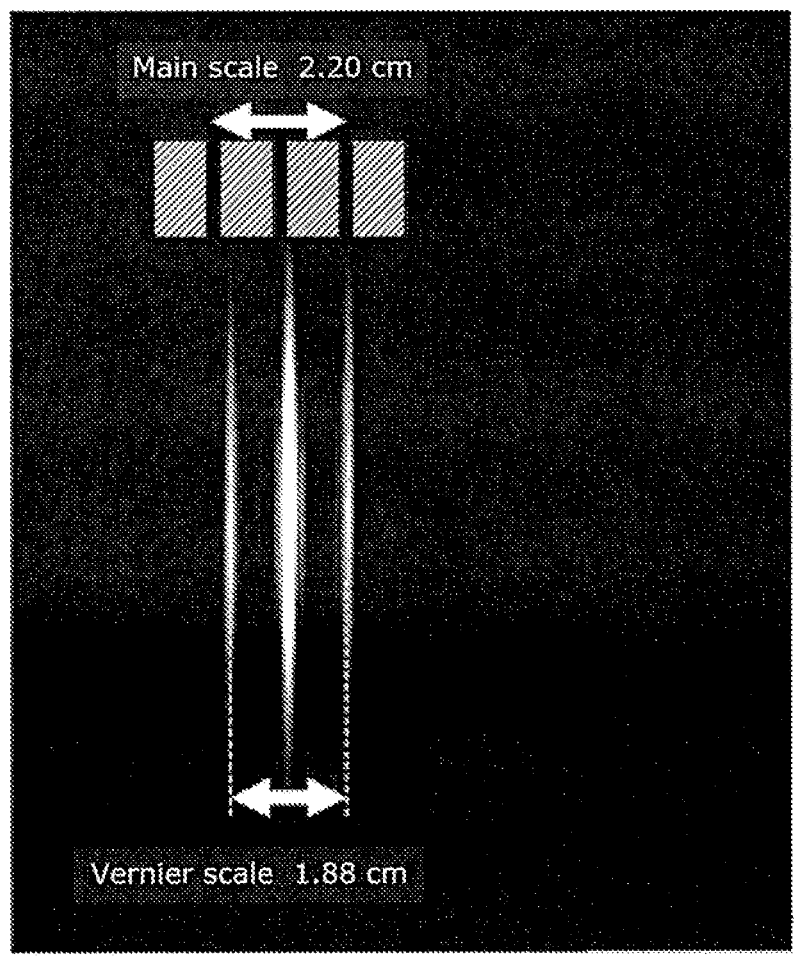
FIG. 9 is a diagram showing a relationship between a main scale and a vernier scale in an experiment.
Figure 10:
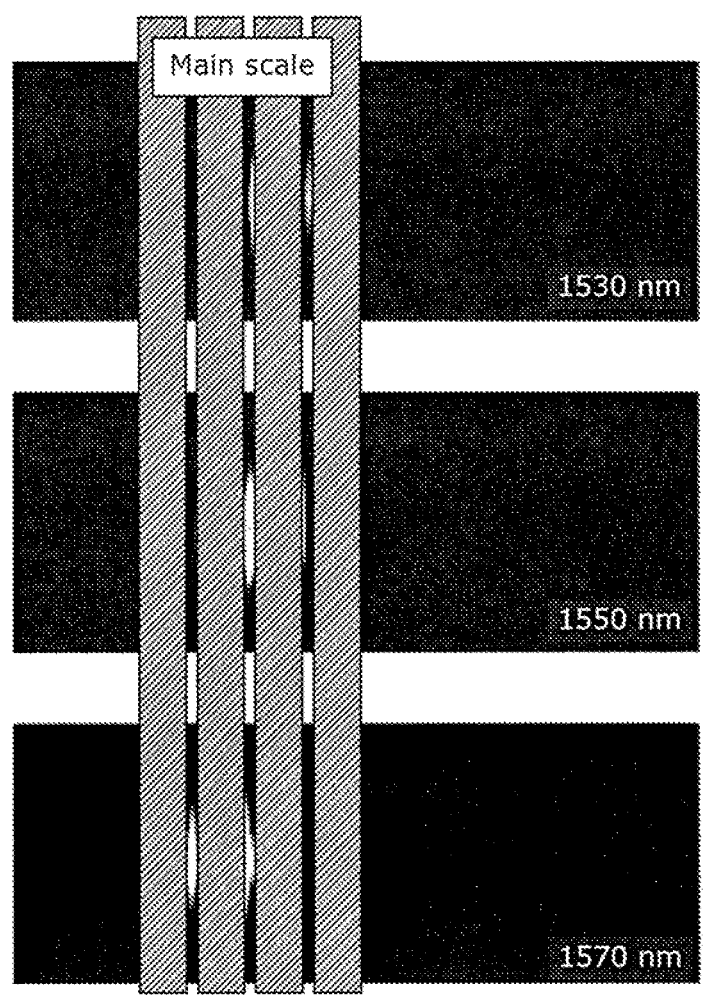
FIG. 10 is a diagram showing an experimental result of wavelength measurement using three second beams as a vernier scale.

Here, the description is given for experimental results of examining whether or not it is possible to measure a wavelength by using a plurality of beams (second beams) as a vernier scale, with reference to FIGS. 8 to 10. It should be noted that the numeral values and the like below are an example of the experiment executed for the examination, and may be different.

In the present experiment, it was examined whether or not it was possible to measure (distinguish) each of wavelengths of three target lights, which were 1530 nm, 1550 nm, and 1570 nm, by using three second beams. Hereinafter, the target light having a wavelength of 1530 nm is referred to as first target light, the target light having a wavelength of 1550 nm is referred to as second target light, and the target light having a wavelength of 1570 nm is referred to as third target light.

Furthermore, in the present experiment, an arrayed diffraction grating group consisting of three kinds of diffraction gratings having different pitches was used as the second dispersion device. Therefore, the second dispersion device dispersed each of the target lights into three second beams.

FIG. 8 is a diagram showing dispersion results of the three second beams dispersed by each of the three target lights. The three second beams of the second target light were shifted to the left with respect to the three second beams of the first target light. The three second beams of the third target light were shifted to the left with respect to the three second beams of the second target light. In other words, as a wavelength was longer, the second beams were further shifted to the left.

FIG. 9 is a diagram showing a relationship between the main scale and the vernier scale in the experiment. In the present experiment, in the image, two graduations of the main scale indicated 2.2 cm, and two graduations of the vernier scale indicated 1.88 cm. In other words, an interval between two adjacent graduations of the main scale was 1.1 cm, and an interval between two adjacent graduations of the vernier scale was 0.94 cm. Therefore, a ratio of the graduation interval of the vernier scale to the graduation interval of the main scale was 0.85 (=0.94/1.1).

FIG. 10 is a diagram showing a result of the experiment in which the wavelength was measured by using three second beams as a vernier scale. More specifically, FIG. 10 shows a result of causing the graduations of the main scale to overlap the three second beams for each of the target lights.

Here, it is assumed that the second beam on the right in each image was used also as the first beam. The first beam of the first target light matched a graduation on the right of the main scale. However, the first beam of the third target light was not shifted enough to reach a graduation at the center of the main scale. In other words, only the first beam and the main scale were not sufficient to recognize a difference of 40 nm. That is, a unit of measurement of the main scale was longer than 40 nm, and a wavelength range specified by the main scale was longer than 40 nm.

Meanwhile, focusing the three second beams, it was found that a second beam having reached a position corresponding to a graduation of the main scale was different among the first to three target lights, More specifically, regarding the first target light, a second beam having reached a position corresponding to a graduation of the main scale was the second beam on the right. Regarding the second target light, a second beam having reached a position corresponding to a graduation of the main scale was the second beam at the center. Regarding the third target light, a second beam having reached a position corresponding to a graduation of the main scale was the second beam on the left.

In other words, the present experiment could distinguish wavelengths of the first to third target lights. More specifically, the use of three second beams as a vernier scale could measure a wavelength of target light by unit of measurement of 20 nm that was smaller than a unit of measurement of the main scale.

INDUSTRIAL APPLICABILITY

The light wavelength measurement apparatus according to the aspect of the present invention is capable of measuring a wavelength of target light with high accuracy. The light wavelength measurement apparatus is applicable to, for example, a spectrum analysis device, a light A/D conversion device, and the like.

REFERENCE SIGNS LIST 100, 150, 200 light wavelength measurement apparatus
110, 210 dispersion device
110a first dispersion device
110b second dispersion device
120, 170, 220 measurement unit
121, 173, 221 lens
122, 174, 222 imaging device
123, 175, 224 measuring unit
172 slit member
223 optical filter

The invention claimed is:

1. A light wavelength measurement method of measuring a wavelength of target light, the light wavelength measurement method comprising:
receiving the target light on a dispersion device that disperses the target light into a plurality of beams which reach a plurality of positions, the plurality of positions corresponding to the wavelength of the target light and being arranged at a beam interval different from a main-scale interval between adjacent graduations of a main scale; and
measuring the wavelength of the target light by using the beam interval that is an interval between the plurality of the beams as a vernier scale for measuring the wavelength of the target light within a wavelength range specified by the main scale,
wherein the plurality of the beams are a plurality of second beams, the dispersion device is a second dispersion device, and
the light wavelength measurement method further comprises:
receiving the target light on a first dispersion device that disperses the target light into a first beam which reaches a position corresponding to the wavelength of the target light; and
specifying the wavelength range including the wavelength of the target light based on a positional relationship between the first beam and the main scale,
wherein in the measuring of the wavelength of the target light,
the wavelength of the target light is measured within the wavelength range specified in the specifying, by extracting, from the plurality of the second beams, a second beam which reaches a position corresponding to a graduation of the main scale.

2. A light wavelength measurement apparatus that measures a wavelength of target light, the light wavelength measurement apparatus comprising:
a dispersion device that disperses the target light into a plurality of beams which reach a plurality of positions, the plurality of positions corresponding to the wavelength of the target light and being arranged at a beam interval different from a main-scale interval between adjacent graduations of a main scale;
a measurement unit configured to measure the wavelength of the target light by using the beam interval that is an interval between the plurality of the beams as a vernier scale for measuring the wavelength of the target light within a wavelength range specified by the main scale; and
a first dispersion device configured to receive the target light and disperse the target light into a first beam which reaches a position corresponding to the wavelength of the target light,
wherein the plurality of the beams are a plurality of second beams,
the dispersion device is a second dispersion device, and
the measurement unit is further configured to:
specify the wavelength range including the wavelength of the target light based on a positional relationship between the first beam and the main scale; and
extract, from the plurality of the second beams, a second beam which reaches a position corresponding to a graduation of the main scale, during the measure of the wavelength of the target light, the wavelength of the target light being measured within the specified wavelength range.

* * * * *